May 19, 1925.
A. LAMBLIN
RADIATOR
Filed July 6, 1922 2 Sheets-Sheet 1
1,538,827
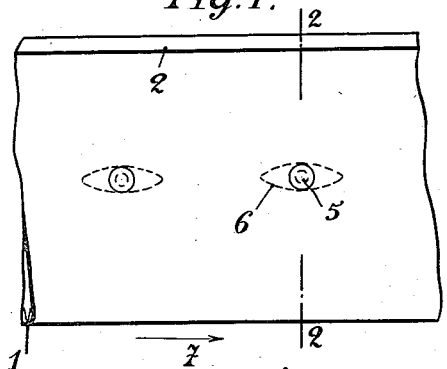
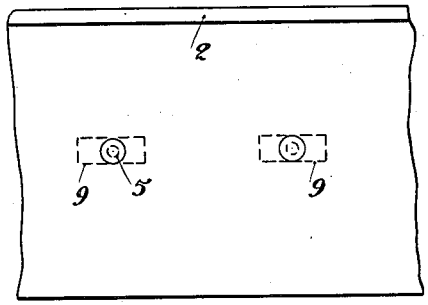
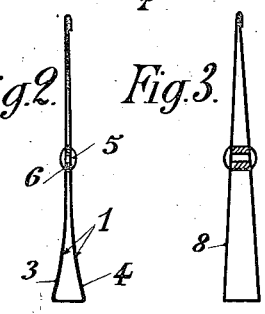
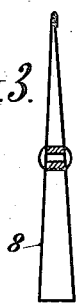
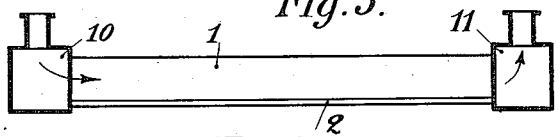
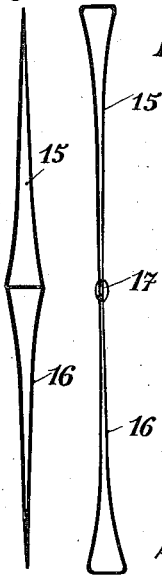
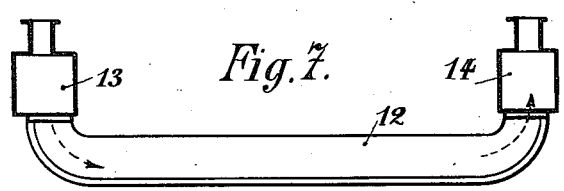
ALEXANDRE LAMBLIN
INVENTOR;
By *Otto Lyunk*
his Attorney.

May 19, 1925. 1,538,827
A. LAMBLIN
RADIATOR
Filed July 6, 1922 2 Sheets-Sheet 2
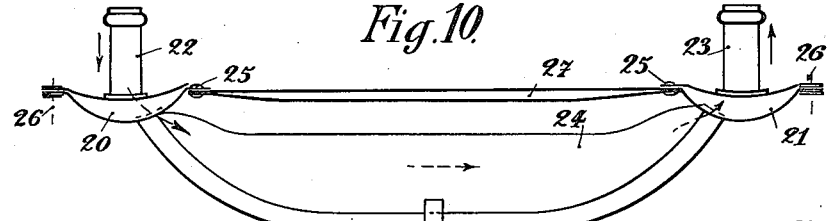
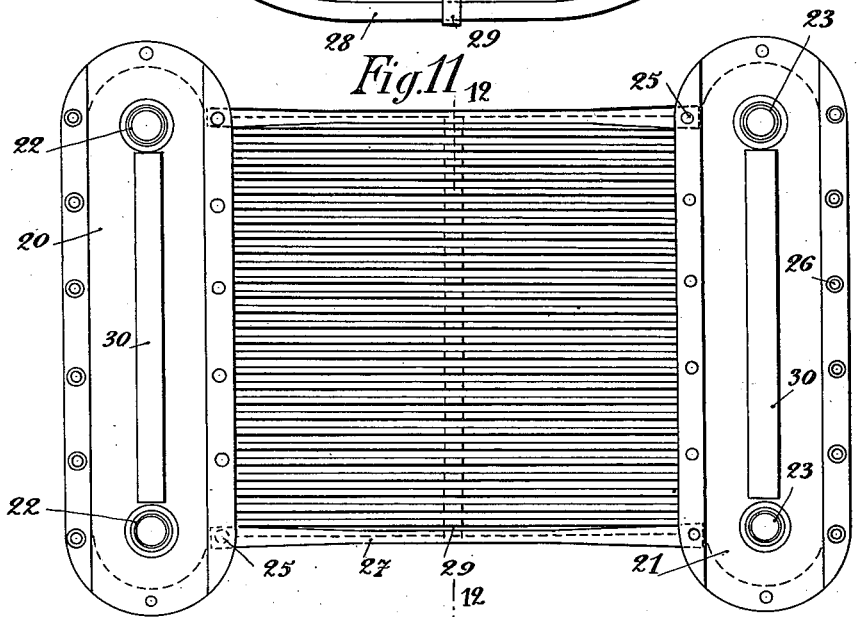
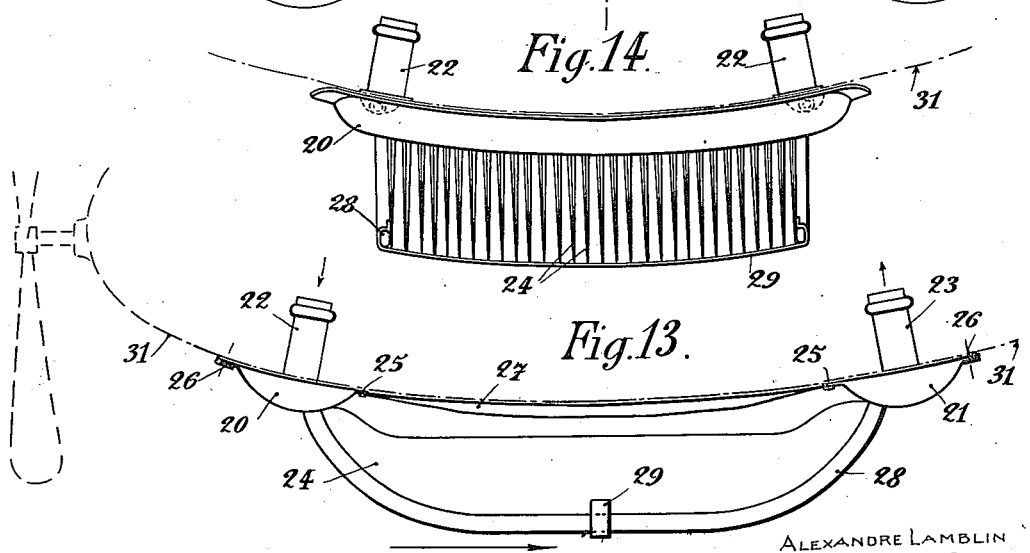
ALEXANDRE LAMBLIN
INVENTOR;
By *his* Attorney.

Patented May 19, 1925.

1,538,827

UNITED STATES PATENT OFFICE.

ALEXANDRE LAMBLIN, OF PARIS, FRANCE.

RADIATOR.

Application filed July 6, 1922. Serial No. 573,172.

*To all whom it may concern:*

Be it known that I, ALEXANDRE LAMBLIN, a subject of the Kingdom of Belgium, residing at Paris, France, have invented certain new and useful Improvements in or Relating to Radiators, of which the following is a specification.

The powerful thermal motors which are employed at the present time, particularly in aviation, require to be lubricated with assured and perfect regularity by a well cooled oil, but one which remains sufficiently fluid in order to permit of a normal circulation and the necessary lubrication of all parts of the motor. Now if this oil is too hot and too fluid, its lubricating power diminishes whereas on the contrary if the oil becomes too cold, it thickens and circulates badly in the parts of the motor. Consequently for the various conditions under which the motor is run, the cooling of the lubricant must vary automatically.

The present invention relates to an improved cooling element for oil radiators which permits of the above result being obtained. This element has a transverse section constituted by an enlarged part in which the lubricant circulates constantly under normal working conditions, this enlarged part communicating with a very attenuated part in which the lubricant can congeal over a more or less large expanse according to the conditions of cooling.

The invention extends also to a particular method of mounting water or oil radiators on their support, such as the aeroplane. This method of mounting comprises a front and a rear header, the faces of which are made in concordance with the form of the support, such as the body of an aeroplane, these headers being connected to each other by a flexible frame which permits of these headers being fitted exactly on the said support.

The invention extends finally to various characteristic features of construction hereinafter described.

Various arrangements according to the invention are shown by way of example in the accompanying drawings in which:

Figure 1 is a partial elevation of an oil radiator cooling element.

Figure 2 is a transverse section of this element on the line 2—2 of Figure 1.

Figure 3 is a transverse section of another form of element.

Figure 4 is a partial elevation of a third form.

Figures 5 and 6 are respectively a side view and an underneath plan view of an oil radiator provided with the preceding elements.

Figure 7 is a modification of the mode of mounting the preceding cooling elements on the headers.

Figure 8 is a transverse section of a particular grouping of the preceding cooling elements.

Figure 9 is a transverse section of a modification of the preceding grouping.

Figure 10 is a side view of a particular group of headers according to the invention.

Figure 11 is an underneath plan view of the preceding group.

Figure 12 is a transverse section of the preceding arrangement on the line 12—12 of Figure 11.

Figure 13 is an elevation of one form of the radiator indicated as being mounted on the fuselage of an aeroplane.

Figure 14 is a front view of the same radiator.

Each of the radiator cooling elements (see Figures 1 and 2) is constituted by a plate 1 suitably stamped out, the two edges of which are fixed to each other at 2, by soldering, riveting, brazing, caulking or any other process. The transverse section of this element effects the form of a mixtilinear isosceles triangle the equal sides 3, 4 of which are arcs of curves concave from the outside.

The external shape of these hollow cooling elements is therefore similar to the external shape of the cast solid gills used for the direct cooling of motor cylinders.

The two side faces 3, 4 of the element are connected to each other at intervals by cross bars 5 which grip between the faces 3 and 4 washers 6 of elongated form, the major axis of these washers being parallel with the direction of circulation 7 of the lubricant in the cooling element.

The oil cooling element above described works in the following manner:

The oil cooled by the air thickens in the very attenuated part of the element comprised between the row of cross bars 5 and the edge 2 and remains there practically stagnant. The cross bars 5 and the elongated washers 6 also contribute to keep this mass of thickened oil isolated.

A current of fluid and hot oil continues to circulate freely in the enlarged part of the section of the element.

The calorific changes take place on the one hand by direct contact in the enlarged part of the element between the more liquefied hot oil and the metal walls cooled by the air, and on the other hand by conductivity between the stream of liquid hot oil and the thickened mass of cold oil which stagnates in the attenuated part 2.

If the current of liquid oil from the enlarged part of the element gives up heat it produces the liquefaction of a certain quantity of the thickened oil in the attenuated part 5, 2, and consequently the transverse section of the stream of liquid oil increases, as well as the cooling metal surfaces in direct contact with this liquid stream, with the result that the cooling of the current of hot oil increases.

On the contrary if for any reason, the temperature of the hot liquefied oil falls, a certain quantity of this oil in contact with the oil already thickened in the zone 5, 2 will itself thicken and become stationary with the result that the surfaces of direct contact of the liquid stream with the cooling metal walls diminish.

Consequently whatever may be the variation which occurs in the cooling of the motor, the cooling capacity of the element adapts itself automatically to this variation.

The cooling element above described may be modified in numerous ways. For example, its transverse section may affect (see Figure 3) the form of an isosceles triangle 8.

The shape of the washers 6 may also be modified at will. For example they may be simply given the form of small rectangles 9 (see Figure 4). In a general way these washers may be replaced by any form of device interposed between the enlarged part of the transverse section of the cooling element and its constricted part, such device serving to hinder the communication between these two parts.

The invention extends to the application of the elements above described to the cooling of the oil or similar lubricating product for thermal motors whatever be the position and grouping of these elements; whatever be the headers on which they are mounted; and whatever be the mode of circulation of the oil in the radiator.

Thus for example (see Figures 5 and 6) the elements 1 may be mounted between a front header 10 and a rear header 11, the oil circulating through the elements in the manner indicated by the arrows in these two figures.

Each element may with advantage (see Figure 7) be made to terminate at the lower faces of the headers 13, 14. The longitudinal section of the element 12 then affects the form of a sword blade. A particularly active circulation of cooling air is thus obtained, the headers not hindering the passage of the air between the cooling elements.

The cooling elements may be so arranged as to form a single sheet of general prismatic form (see Figures 5 and 6) or of rounded form prolonging the rounded form of the headers.

These elements may constitute a single sheet (see Figures 5 to 7) or on the contrary may form several sheets separated from each other. For example the cooling elements 15, 16 may be grouped two by two symmetrically with respect to a common apex 17 (see Figure 8) or with respect to their common base (see Figure 9).

The various examples of combinations into which the above cooling elements can enter may obviously be multiplied.

The invention extends also to a particular mode of mounting the radiators on their support such as the body of an aeroplane (see Figures 10 to 14). This mode of mounting the elements is applicable both to oil and water radiators whatever be otherwise the cooling elements interposed between the headers.

The radiator is provided with a front header 20 and a rear header 21. Each of these headers has a transverse section in the shape of a crescent or a convergent meniscus (see Figure 10).

The lateral surfaces of these headers may be cylindrical surfaces (see Figure 12) or more complex highly curved surfaces.

Each of these headers is obtained by connecting to each other the flanges of two plates by caulking and soldering, or by rivets 25 and soldering or in any other convenient manner.

The flanges of the two plates may also have eyelets 26 through which pass the stems of fixing bolts.

Branches 22 for the admission of hot fluid and 23 for the outlet of cold fluid are provided respectively on the front and rear headers.

Cooling elements 24 of any type, for example of the type shown in Figure 7, are attached to the lower faces of the headers 20, 21.

To fix these elements on the headers it suffices to fit the ends of the elements into the stamped out edges of the headers and to solder them therein.

The strengthening frame of the radiator has cross bars 27 parallel with the cooling elements 24 and fixed by rivets 25 to the flanges of the headers 20, 21.

The extreme cooling elements are also reinforced by a sheet metal tube 28 which terminates in the headers 20, 21 and is applied to the outer face of each of these elements following its outer edge, this tube serving both to reinforce the radiator and to cool the liquid to be cooled. This tube 28 may also be replaced by any sheet metal strengthening device fixed to the edge of the two extreme cooling elements of the radiator.

A cross bar 29 at right angles to the cooling elements 24, keeps these elements at suitable distances apart.

Cross bars 30 are fixed to the upper faces of the headers 20, 21 and connect the inlet branches 22 on the one hand and the outlet branches 23 on the other hand to each other.

The radiator above described is fixed in the following manner under the body 31 of an aeroplane (see Figures 13 and 14). In consequence of the slightly concave form of the headers 20, 21 they can easily be attached to the fuselage 31 as they fit accurately the shape of this latter. The fixing of the radiator is then effected by bolting the collectors to the said fuselage at 26.

The frame 27, 28, 29 and the cooling elements 24 in consequence of the arrangements above described lend themselves to this slight longitudinal and transverse curvature of the radiator without there being any fear of the cooling elements becoming detached or damaged to cause leakage of the liquid.

As the radiator thus exactly fits the body of the aeroplane all injurious eddies of air are avoided and the resistance offered by the air to movement of the aeroplane is reduced as much as possible.

Furthermore the meniscus or crescent shape of the headers permits of the free expansion of the radiator without any risk of rupture of the elements.

In the example shown in the drawings (see Figures 10 to 14) it has been supposed that the transverse section of the headers was in the form of a crescent or a converging meniscus. The form of this section may obviously be so varied as to permit the headers to fit exactly the shape of their support, the body of the aeroplane for example. If the body of the aeroplane were flat the upper faces of the collectors would be flat, the transverse section of these headers affecting then the form of a plano-convex meniscus or of a segment of a circle.

Although the above radiator has been described as being supposed to be applied to an aeroplane it may obviously be also mounted on a reservoir or on a motor casing of an automobile.

Finally it is well to remember that the invention rests upon the form given to the headers and on the mode of mounting the radiator on its support, whatever be the cooling elements interposed between the headers.

Claims:

1. A cooling element for oil or similar lubricating product radiators, such element having a transverse section with an enlarged part in which the lubricant circulates constantly in normal working, this enlarged part communicating with a very attenuated part, in which the lubricant can congeal over a more or less great expanse, according to the conditions of cooling.

2. A cooling element as specified in claim 1 in which devices are interposed between the enlarged part and the attenuated part, which devices tend to hinder communication between these two parts.

3. A cooling element, as claimed in claim 1, in which devices are interposed between the enlarged part and the attenuated part, which devices tend to hinder communication between these two parts, said devices being elongated washers the major axes of which are parallel with the direction of flow of the lubricant.

4. A cooling element as specified in claim 1, having the form in cross section of a mixtilinear triangle, very elongated with sides (3, 4) concave towards the outside.

5. A cooling element for oil or similar lubricating product radiators, comprising the combination of two tubes secured together, the transverse sections of said tubes being symmetrical one to the other, the transverse section of each of the tubes presenting an enlarged part wherein the lubricant circulates constantly during normal operation, said enlarged part communicating with a greatly reduced part wherein the lubricant may congeal over a greater or less expanse, depending on the cooling conditions.

6. In a radiator, the combination of cooling elements, a front header and a rear header between which said cooling elements are interposed, each of said headers being crescent shaped in transverse section, and a flexible frame connecting said two headers together whereby the radiator is capable of adapting itself to a rounded support such as the fuselage of an aeroplane.

In testimony whereof I affix my signature.

ALEXANDRE LAMBLIN.